United States Patent Office 3,531,748
Patented Sept. 29, 1970

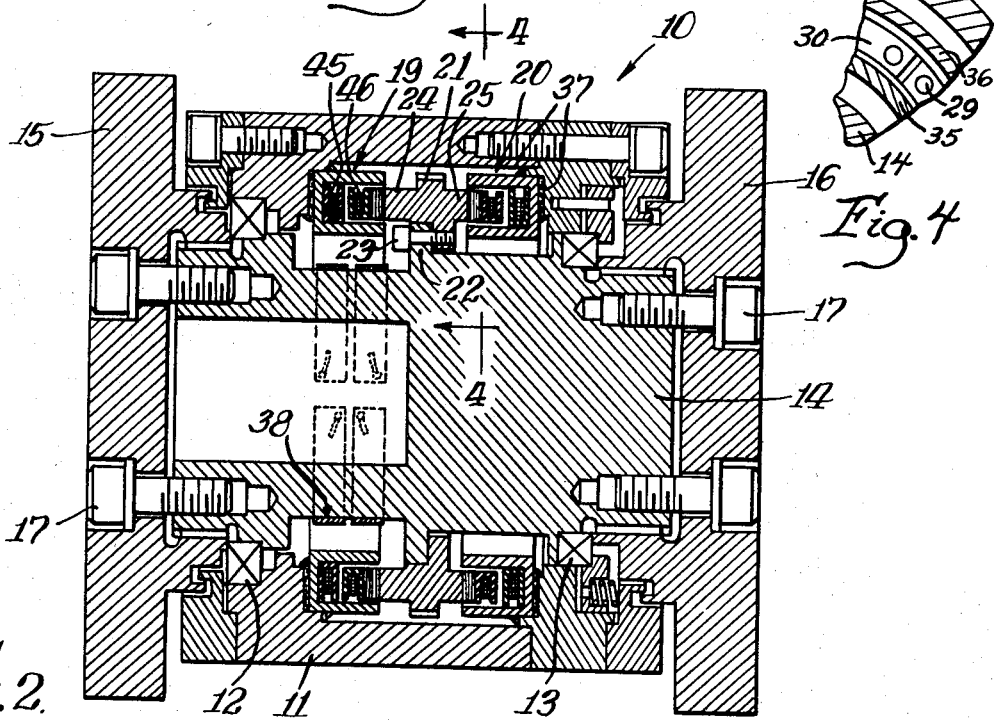

3,531,748
ROTARY TRANSFORMER CONSTRUCTION
Richard S. Tveter, Glenview, and Sydney Himmelstein, Park Ridge, Ill., assignors to S. Himmelstein and Company, a corporation of Illinois
Filed Oct. 23, 1968, Ser. No. 770,044
Int. Cl. H01f 21/06
U.S. Cl. 336—120                                                10 Claims

ABSTRACT OF THE DISCLOSURE

A rotary transformer having rotor coils adapted to be mounted on a rotor. Support means are provided for fixedly mounting associated stator coils in coaxial, axially spaced relationship to the rotor coils. The rotor coil support comprises a plurality of annular laminations formed of high strength material such as transformer steel, permitting the use of the rotary transformer with high rotational speed devices.

BACKGROUND OF THE INVENTION

Field of the invention

This invention relates to rotary transformers and in particular to a rotary transformer construction permitting use thereof at high rotational speeds.

Description of the prior art

In conventional rotary transformer constructions, the transformer rotors are formed of suitable permeable materials such as ferrite ceramic type materials. Such materials have been found to have undesirable variability in the strength thereof and, resultingly, present a problem at relatively high rotational speeds where substantial centrifugal forces may be developed in the rotor.

SUMMARY OF THE INVENTION

The present invention comprehends an improved rotary transformer construction eliminating the disadvantages of the known rotary transformer constructions as discussed above, in a novel and simple manner. More specifically, the invention comprehends a rotary transformer construction wherein the rotor coils are carried in coaxial, axially spaced relationship to stator coils fixed adjacent thereto. The rotors herein comprise a plurality of annular laminations which may be formed of high strength material and more specifically, material having a strength substantially greater than conventional ferrite materials used in conventional rotary transformer rotors. Thus, the invention comprehends a rotary transformer having improved means for mounting the rotor coils thereof suitable for use in rotary devices having extremely high rotational speeds.

BRIEF DESCRIPTION OF THE DRAWING

Other features and advantages of the invention will be apparent from the following description taken in connection with the accompanying drawing wherein:

FIG. 1 is a diametric section of a rotary transformer construction embodying the invention;

FIG. 2 is a schematic wiring diagram of the rotary transformer as used illustratively in a torquemeter system;

FIG. 3 is a fragmentary enlarged diametric section of a portion of the rotary transformer illustrating in greater detail the rotor and stator coil arrangement; and FIG. 4 is a fragmentary reduced cross-section taken substantially along the line 4—4 of FIG. 1.

DESCRIPTION OF THE PREFERRED EMBODIMENT

In the exemplary embodiment of the invention as disclosed in the drawing, a rotary transformer generally designated 10 is shown to comprise a housing 11 provided with spaced bearings 12 and 13 rotatably journalling a shaft 14. The shaft may be provided at its opposite ends with flanges 15 and 16 secured thereto as by bolts 17 for connection of the rotary transformer in a rotating system such as a power drive system. The rotary transformer 10 is illustratively shown as for use in indicating a torque transmitted through the shaft 14 and, thus, in the illustrative embodiment, the transformer comprises a portion of a torquemeter generally designated 18.

The rotary transformer includes a pair of transformer sections generally designated 19 and 20. Illustratively, transformer section 19 may comprise an input section and transformer section 20 may comprise an output section. The transformer sections are reversely similar and, thus, the specific description thereof is given herein in connection with transformer section 20 as shown in FIG. 3, it being understood that the respective elements thereof are reversely similar in transformer section 19. As shown in FIG. 1, the transformer sections 19 and 20 are carried on an isolation ring 21 which is fixedly secured to an annular flange 22 on the shaft 14 by suitable means such as bolts 23. The isolation ring 21 defines a rotor support having axially outwardly extended annular flanges 24 and 25.

As shown in FIG. 3, the coil 26 of transformer section 20 is wound in a rotor coil form 27 which is secured coaxially to a rotor 28 and the flange 25 of the rotor support 21 by suitable means such as screws 29. The rotor 28 comprises a plurality of thin laminations 30 formed of a permeable material having high tensile strength. More specifically, the laminations are preferably formed of a material having a tensile strength substantially greater than that of conventional ferrite ceramic type materials. One example of such a high strength material is conventional transformer steel. The use of such a high tensile strength steel laminated core permits the use of the rotary transformer where the shaft 14 is driven at high rates of speed such that centrifugal stresses generated in the conventional ferrite materials would render such structures unsafe.

The laminations 30 are preferably discontinuously annular and in the illustrated embodiment are semiannular to provide a suitable gap in the electrical path of the respective laminations for improved transformer performance. Thus, the discontinuous annular circuit precludes electrical shorting of the rotor construction which would otherwise substantially degrade performance of such a rotary transformer.

The stator coil 31 is wound in a stator coil form 32 which is fixedly secured in an annular stator core 33 having a bight portion 34 and axially extending annular legs 35 and 36 straddling the stator coil assembly and the rotor coil assembly and the rotor 28. The stator core 33 may be formed of conventional ferrite materials secured to the housing 11 by conventional means such as by epoxy cement 37. As best seen in FIG. 3, the stator coil is thusly coaxially, axially spaced from the rotor coil with the magnetic coupling between the rotor and stator coils being completed through the laminated rotor 28 and U-section stator core 33. The rotor core support 21 is preferably formed of a material having high electrical conductivity and reluctance, such as a high strength metal. Illustratively, the support 21 is formed herein of aluminum.

As indicated briefly above, rotary transformer 10 may be utilized as shown herein illustratively in a torquemeter 18 wherein a strain gage generally designated 38 is mounted on the shaft 14 for sensing torsion in the shaft resulting from torque transmission therethrough. As shown in FIG. 2, the strain gage 38 may comprise a plurality of strain sensing elements 39 arranged in a conventional Wheatstone bridge circuit for controlling a signal delivered from an oscillator 40 through the input transformer section 19 to the strain gage 38. The output from the strain gage is delivered through the output transformer section 20 to suitable readout means 41 including conventional balance controls 42, detector and amplifier means 43, and indicator and/or recorder means 44. Thus, the input signal from the oscillator 40, which may comprise a wide band signal having a frequency of 1 to 25 kHz., is delivered through the stator coil 45 and rotor coil 46 of input transformer section 19 to the strain gage 38 which varies the signal in accordance with the torque transmitted through shaft 14 to provide an output signal through rotor coil 26 and stator coil 31 of output transformer section 20 for delivery to the output readout means 41. As discussed, the flux linkage between the rotor and stator coils is through the improved laminated rotor 28 permitting the rotary transformer 10 to function at high rotational speeds with improved safety.

While rotary transformer 10 has been illustrated in connection with a torquemeter structure, as will be obvious to those skilled in the art, the rotary transformer may have many other applications as where signals are to be transferred between rotating and stationary portions of an apparatus.

The rotary transformer 10 is extremely simple and economical of construction while yet providing the highly desirable features discussed above.

While we have shown and described one embodiment of our invention, it is to be understood that it is capable of many modifications. Changes, therefore, in the construction and arrangement may be made without departing from the spirit and scope of the invention as defined in the appended claims.

We claim:
1. A rotary transformer structure comprising:
a rotary support;
a plurality of segmentally annular, planar laminations defining a rotor core;
means securing said rotor core to said rotary support to project axially outwardly from said rotary support and define an outer end;
an annular rotor coil secured to said rotor core to project axially outwardly from said outer end thereof;
a stationary support spaced axially outwardly of said rotor coil;
an annular stator core having an axially opening U-shaped cross-section defined by an outer bight portion and inwardly projecting radially spaced annular legs;
means securing said stator core bight portion to said stationary support with said legs projecting axially inwardly from said stationary support and straddling said rotor coil with one leg disposed radially outwardly of said rotor coil and the other leg disposed radially inwardly thereof; and
a stator coil secured to said stator core bight portion to project axially inwardly from said bight portion to adjacent said rotor coil.
2. The rotary transformer section of claim 1 wherein said rotor core is formed of steel.
3. The rotary transformer of claim 1 wherein said stator core legs extend axially inwardly to straddle said rotor core.
4. The rotary transformer of claim 1 wherein said means securing said rotor core to said rotor support further defines means for securing said rotor coil to said rotor core.
5. The rotary transformer of claim 1 wherein said means securing said rotor core to said rotor support comprises screw means further securing said rotor coil to said rotor core.
6. The rotary transformer of claim 1 wherein said each of said coils includes an annular coil form having a U-shaped cross-section opening radially outwardly.
7. The rotary transformer of claim 1 wherein said rotor coil includes an annular coil form having a U-shaped cross-section opening radially outwardly and said means securing said rotor core to said rotor support further defines means for securing one leg of said rotor coil form to said rotor core.
8. The rotary transformer of claim 1 further including a second plurality of segmentally annular, planar laminations defining a second rotor core, means securing said second rotor core to said rotary support to project axially inwardly from said rotary support and define an inner end, a second annular rotor coil secured to said second rotor core to project axially inwardly from said inner end thereof, a second stationary support spaced axially inwardly of said second rotor coil, a second annular stator coil having an axially opening U-shaped cross-section defined by an inner bight portion and outwardly projecting radially spaced annular legs, means securing said second stator core bight portion to said second stationary support with said legs thereof projecting axially outwardly from said second stationary support and straddling said second rotor coil with one leg disposed radially outwardly of said second rotor coil and the other leg disposed radially inwardly thereof, and a second stator coil secured to said second stator core bight portion to project axially outwardly from said bight portion thereof to adjacent said second rotor coil.
9. The rotary transformer section of claim 8 wherein said rotary support is formed of a material having high electrical conductivity and reluctance.
10. The rotary transformer of claim 1 wherein said annular rotor coil is disposed fully externally of said rotor core.

References Cited

UNITED STATES PATENTS

| | | | |
|---|---|---|---|
| 1,394,901 | 10/1921 | Hobart | 336—234 XR |
| 2,283,942 | 5/1944 | Morris | 336—119 XR |
| 2,894,231 | 7/1959 | Krasno | 336—123 XR |
| 3,317,873 | 5/1967 | Himmelstein | 336—120 |
| 3,179,909 | 4/1965 | Cheney | 336—132 XR |
| 3,317,874 | 5/1967 | Honsinger | 336—83 XR |
| 3,348,181 | 10/1967 | Stromswold | 336—120 |

FOREIGN PATENTS 268,842  6/1965  Australia.

THOMAS J. KOZMA, Primary Examiner

U.S. Cl. X.R.

336—234